United States Patent
Oka et al.

(10) Patent No.: US 8,106,150 B2
(45) Date of Patent: Jan. 31, 2012

(54) POLYLACTIDE MANUFACTURING APPARATUS AND METHOD FOR MANUFACTURING POLYLACTIDE

(75) Inventors: Kenichiro Oka, Mito (JP); Toshiaki Matsuo, Mito (JP); Masayuki Kamikawa, Hitachinaka (JP); Naruyasu Okamoto, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 427 days.

(21) Appl. No.: 12/453,912

(22) Filed: May 27, 2009

(65) Prior Publication Data

US 2009/0299018 A1  Dec. 3, 2009

(30) Foreign Application Priority Data

May 27, 2008  (JP) ................................ 2008-138422

(51) Int. Cl.
- *C08G 63/08* (2006.01)
- *B01D 53/78* (2006.01)
- *B01J 19/18* (2006.01)

(52) U.S. Cl. .............. 528/359; 528/354; 422/305; 95/8; 95/199; 95/239; 96/243; 96/244

(58) Field of Classification Search ................ 528/354, 528/359; 422/305; 95/8, 199, 239; 96/243, 96/244

See application file for complete search history.

(56) References Cited

U.S. PATENT DOCUMENTS

| 3,778,969 A * | 12/1973 | Sudduth ........................ 95/237 |
| 2005/0239999 A1 | 10/2005 | Okubo et al. | |

FOREIGN PATENT DOCUMENTS

| JP | 10-17653 | 7/1996 |
| JP | 2004-010791 | 6/2002 |
| JP | 2004-169013 | 10/2003 |

OTHER PUBLICATIONS

Extended European Search Report mailed Aug. 28, 2009.

* cited by examiner

*Primary Examiner* — Fred M Teskin
(74) *Attorney, Agent, or Firm* — Stites & Harbison PLLC; Juan Carlos A. Marquez, Esq.

(57) ABSTRACT

In a process of manufacturing polylactide, synthesis of high-quality polymers is achieved with a sufficient degree of vacuum secured. Provided is an apparatus for manufacturing polylactide which includes the steps of preparing lactide through oligomerization of lactic acid and depolymerization of the resulting oligomers, effecting ring-opening polymerization of the lactide, and removing unreacted lactide. The apparatus comprises an exhausting gas treatment device for reducing pressure in the step of removing unreacted lactide. The exhausting gas treatment device includes boilers (81-83) for generating water vapor; a pressure-reducing section having stages each including an ejector (71-73) driven with the water vapor, a condenser (61-63) connected downstream of the ejector, and a hot well tank (41-43) connected to the condenser; and a main condenser 60 and a main hot well tank 40 connected to the main condenser that are disposed on a pipe line through which a gas of the unreacted lactide is suctioned into the pressure-reducing section. The gas of the unreacted lactide is washed away in the main condenser using a liquid containing lactic acid as a main component that has been collected in the main hot well tank.

17 Claims, 2 Drawing Sheets

POLYLACTIDE MANUFACTURING APPARATUS AND METHOD FOR MANUFACTURING POLYLACTIDE

BACKGROUND OF THE INVENTION

1. Field of the Invention

The present invention relates to a method and apparatus for removing unreacted monomers and unreacted lactide (dimers of lactic acid) from polylactide.

2. Background Art

For removing unreacted substances from polylactide, it has become increasingly difficult, with an increase in size of plants, to ensure the degree of vacuum that is required for removing such unreacted substances with the use of a prior-art vacuum pump alone.

In addition, during a vacuum suction time, a problem may arise that condensation products such as lactic acid monomers or lactide would scatter in an exhausting gas treatment device, which could cause plugging or corrosion.

Polylactide, which is one type of polymers synthesized by a ring-opening polymerization reaction, is polyester that is transparent and colorless and is produced from lactic acid, which is one of hydroxycarboxylic acids, as a raw material. Among methods of synthesizing polylactide from lactic acid is a method that includes the steps of producing oligomers by condensation of lactic acid, depolymerizing the oligomers by addition of a catalyst such as antimony oxide so as to produce lactide (a dimer of lactic acid), which is a cyclic condensation product, effecting ring-opening polymerization of the lactide by addition of a catalyst such as stannous octoate, and removing unreacted lactide and monomers. In such a method, pressure reduction by vacuum evacuation is performed in each process of the oligomer production, oligomer depolymerization, and monomer removal, so that unreacted monomers and lactide are removed. In that case, if the degree of vacuum is not sufficient, it would be impossible to sufficiently remove unreacted monomers and lactide, which could result in deterioration in the quality of products. The same can be said for the production of polyglycolic acid, which is synthesized by the ring-opening polymerization of glycolide which is a cyclic dimer of glycolic acid.

For removing unreacted monomers and lactide during the process of removing monomers, it is necessary to use a vacuum-evacuation removal device. The technique of Reference 1 is known as such a removal device and method.

Reference 1 (JP Patent No. 3812564 B) discloses a method of removing tetrahydrofuran, which is a by-product generated during the production of polybutylene terephthalate, which is one type of polymers obtained by polycondensation. In particular, Reference 1 discusses an exhausting gas treatment device that uses a polycondensation reaction vessel having two or more pairs of units each including an ejector, a condenser, and a hot well tank. Each ejector is driven with vapor containing 1,4-butanediol as a main component that is one of the raw materials, and the vapor containing 1,4-butanediol as a main component that is discharged from the ejector is condensed with a condenser connected downstream of each ejector, so that the polycondensation reaction vessel is put into a reduced pressure state and a polycondensation reaction is carried out.

SUMMARY OF THE INVENTION

However, the use of the exhausting gas treatment device disclosed in Reference 1 is limited to the use for production of polybutylene terephthalate. Thus, when such a device is operated with the ejectors driven with a different material other than 1,4-butanediol, for example, such as lactic acid, which is a raw material for polylactide, the concentration of lactic acid in the condensers would increase and a polymerization reaction would occur within the condensers. This in turn causes plugging in the exhausting gas treatment device, thereby causing a shortage of vacuum, whereby a polymerization reaction will not proceed. Thus, the degree of polymerization could be insufficient, resulting in deterioration in the quality of products.

In order to solve the aforementioned problems, it is an object of the present invention to provide a polylactide manufacturing apparatus and a method for manufacturing polylactide, wherein a condenser operated with liquid containing lactic acid as a main component is disposed at the first stage of the apparatus, and ejectors that are driven with water vapor are disposed at stages following the first stage, whereby the concentration of lactic acid in the condensers is suppressed so as to avoid plugging that would otherwise occur due to polymerization, and a sufficient degree of vacuum is obtained with the use of a vacuum pump alone.

It is another object of the present invention to reduce the usage rate of corrosion-resistant materials in the whole apparatus by driving ejectors at the stages following the first stage with the use of water vapor, so that the cost of the apparatus is reduced.

In order to achieve the aforementioned objects, the present invention provides an exhausting gas treatment device with multiple stages each including an ejector, a condenser, and a hot well. Specifically, a unit including a condenser operated with liquid containing lactic acid as a main component, and a hot well tank connected to the condenser is provided at the first stage. In addition, at least one stage among the stages that follow the first stage includes a unit including an ejector driven with water vapor, a condenser disposed downstream of the ejector, and a hot well connected to the condenser. Lactic acid collected in the condenser at the first stage is fed back to raw materials.

In the present invention, solutions for driving the ejectors are transferred between the hot wells, in a direction from a latter stage to a front stage, whereby the concentration of lactic acid at the front stage is suppressed. Thus, a sufficient degree of vacuum is ensured and the occurrence of plugging and corrosion is suppressed.

According to the present invention, an exhausting gas treatment device can be realized in which plugging and corrosion resulting from polymerization of lactic acid, which is a raw material, can be suppressed in the production of polymers such as PLA (polylactide) through ring-opening polymerization and in which a sufficient degree of vacuum can be maintained even in a large plant.

DESCRIPTION OF SYMBOLS

1 lactide supply device
2 lactide melting device 3 catalyst supply device
4 polymerization initiator supply device
5 lactide supply device
6 horizontal reaction vessel
7 vertical reaction vessel
8 volatilizer
9-15 liquid transfer pumps
16-22 valves
23 mixing blade wing
24-34 nitrogen gas distribution valves
35 volatilizer valve
36 exhausting gas treatment device
40 main hot well
41-43 hot wells
50 water tank
60 main condenser
61-63 condensers
71-73 ejectors
81-83 boilers
90 vacuum pump

DETAILED DESCRIPTION OF THE PREFERRED EMBODIMENTS

Embodiments of an exhausting gas treatment device and method in accordance with the present invention will be described with reference to the accompanying drawings.

An exhausting gas treatment device and method of the present invention are particularly advantageously used for the production of polylactide.

The method and apparatus of the present invention are particularly advantageously used for exhausting gas treatment in the production of polylactide through the ring-opening polymerization of lactide. Lactide used as a raw material for polylactide herein refers to the cyclic ester produced by the dehydration of lactic acid (wherein two water molecules are removed from two lactic acid molecules). In addition, polylactide refers to a polymer including lactic acid as a main component. Examples of polylactide include a poly(L-lactide) homopolymer, poly(D-lactide) homopolymer, poly(L/D-lactide) copolymer, and a mixture of such polylactide with components with ester-bond forming properties (e.g., polylactide copolymers obtained through copolymerization of hydroxycarboxylic acids, lactones, dicarboxylic acids, diols, and the like), to which an additive is further added as a minor constituent. Examples of hydroxycarboxylic acids other than lactic acid include glycolic acid, hydroxybutyl carboxylic acid, and hydroxybenzoic acid. Examples of lactones include butyrolactone and caprolactone. Examples of dicarboxylic acids include aromatic dicarboxylic acids such as aliphatic dicarboxylic acid with 4 to 20 carbon atoms, phthalic acid, isophthalic acid, terephthalic acid, and naphthalenedicarboxylic acid. Examples of diols include aliphatic diol with 2 to 20 carbon atoms. Oligomers and polymers of polyalkylene ethers such as polyethylene glycol, polypropylene glycol, and polybutylene ether are also used as the components for copolymerization. Similarly, oligomers and polymers of polyalkylene carbonate are also used as the components for copolymerization. Examples of additives include antioxidants, stabilizers, ultraviolet absorbents, pigments, colorants, inorganic particles, various kinds of fillers, mold-releasing agents, plasticizers, and other similar materials. The content of the copolymerization components and the additive rate of the additive to be added to lactide can be any values. When polylactide is to be formed using lactic acid or a lactic acid derivative as a main component, the contents of the copolymerization components and additive are less than or equal to 50 weight % or preferably less than or equal to 30 weight %.

The exhausting gas treatment device and method in accordance with the present invention are directed to the removal of monomers, oligomers, and the like that are included in polymers, in a depolymerization step, two-stage polymerization step, demonomerization step, and after-treatment step included in the polymerization process for producing polylactide. In the present specification, the term "raw material" refers to a constituent element used for the synthesis of polymers through a polymerization reaction. Examples of raw materials include monomers, cyclic monomers, cyclic condensation products of monomers, and oligomers. In the synthesis of polylactide, lactide is used as a raw material, and a reaction solution containing lactide in a melted state and a catalyst is heated with a reaction device, so that ring-opening polymerization of lactide is carried out. As a result, lactide is polymerized in a melted state, and polylactide is synthesized continuously or intermittently. In the present specification, the term "reaction solution" is to be construed as including all of melted substances or products that are circulated in the process of synthesizing polymers, such as melted polymer raw materials, mixture of such melted raw materials and catalysts, mixture of such melted raw materials, catalysts, and polymers with various polymerization degrees.

When a raw material is in a melted state, a catalyst can be directly added to the melted raw material so that the mixture is supplied to a reaction device to effect a polymerization reaction. Meanwhile, when a raw material is in a solid state such as in powder form, the raw material is melted in advance by being heated with a raw-material-melting device. The heating temperature in the raw-material-melting device is not particularly limited as long as it is greater than or equal to the melting point of the raw material. Thus, when lactide is used as the raw material, the heating temperature is not particularly limited as long as it is greater than or equal to 95° C. Typically, the heating temperature is 95° C. to 160° C., or preferably, 110° C. to 130° C. By setting the heating temperature to be less than or equal to 160° C., deterioration of lactide by heat can be avoided. When glycolide is used as the raw material, the heating temperature is not particularly limited as long as it is greater than or equal to 83° C. Typically, the heating temperature is 83° C. to 160° C., or preferably, 90° C. to 130° C. By setting the heating temperature to be less than or equal to 160° C., deterioration of glycolide by heat can be avoided.

A catalyst used for a polymerization reaction can be appropriately selected by one of ordinary skill in the art according to polymers to be synthesized. For example, as a catalyst used for the ring-opening polymerization of lactide, conventionally known polymerization catalysts for producing polylactide can be used. For example, a catalyst including at least one of metals selected from the group consisting of Groups 1A, 4A, 4B, and 5A of the Periodic Table, or metal compounds can be used.

Examples of metals belonging to Group 4A include organotin catalysts (e.g., tin lactate, tin tartrate, tin dicaprylate, tin dilaurate, tin dipalmitate, tin distearate, tin dioleate, α-tin naphthoate, β-tin naphthoate, and stannous octoate) and tin powder. Examples of metals belonging to Group 1A include hydroxide of alkali metals (e.g., sodium hydroxide, potassium hydroxide, and lithium hydroxide), salt of alkali metals and weak acid (e.g., sodium lactate, sodium acetate, sodium carbonate, sodium octoate, sodium stearate, potassium lactate, potassium acetate, potassium carbonate, and potassium octoate), and alkoxide of alkali metals (e.g., sodium methoxide, potassium methoxide, sodium ethoxide, and potassium ethoxide). Examples of metals belonging to Group 4B include titanium compounds such as tetrapropyl titanate and zirconium compounds such as zirconium isopropoxide. Examples of metals belonging to Group 5A include antimony compounds such as antimony trioxide. Among them, organotin catalysts or tin compounds are particularly preferable in terms of their activities.

A catalyst can be added to a melted raw material using a catalyst additive device commonly used in the art. Such catalyst can be supplied to a reaction device at either of the following timings: it can be supplied to the reaction device after it is added to the melted raw material or it can be directly supplied to the reaction device.

In the present invention, a reaction device used for polymerization of raw materials include one or more reaction vessels that are connected in series, and polymerization reactions are carried out by heating a reaction solution containing a melted raw material and a catalyst in the reaction vessels. The number of the reaction vessels included in the reaction device can be any number as long as it is one or more. Typically, the number of the reaction vessels is one to five, or preferably one to four, or more preferably one or two.

Hereinafter, embodiments of a reaction method, a volatilization method, and a volatilizer for polymerization reactions will be described.

In one embodiment of the present invention, melted raw materials are additionally added to polymers that are in an intermediate state between melted raw materials and final polymers, and they are agitated and mixed. As a reaction device to effect a polymerization reaction, it is desirable to use a reaction device including two or more reaction vessels that are connected in series. However, if no problem arises, it is also possible to use a reaction device including a single reaction vessel, in which case addition of raw materials to intermediate polymers and agitating and mixing thereof are carried out in a region between a supply port for polymer raw materials and a discharge port for final polymers. The shape of the reaction vessel is not particularly limited, and those commonly used in the art can be employed. In the aforementioned embodiment, a case of using a reaction device that includes a vessel, in which no substantial polymerization reaction is carried out and which is disposed at the preceding stage of the reaction vessel, falls within the scope of the present invention. Described here is a case in which a reaction device including two reaction vessels that are connected in series is used as a reaction device to effect a polymerization reaction.

A reaction vessel at the first stage is not particularly limited to a certain type, and those commonly used in the art can be employed. However, it is desirable to use a reaction vessel that includes an agitator whose rotation axis is set to be substantially horizontal with respect to the ground, and at least one weir disposed within the vessel. Hereinafter, such a reaction vessel having an agitator whose rotation axis is set to be substantially horizontal with respect to the ground will be referred to as a "horizontal reaction vessel." To be substantially horizontal with respect to the ground does not mean that the rotation axis of the agitator is strictly horizontal. It rather means that the angle formed by the ground, namely, the horizon and the rotation axis is typically −5° to 5°, or preferably −1° to 1°, or more preferably 0°.

The shape of the horizontal reaction vessel is not particularly limited as long as an agitator can be disposed in the vessel with its rotation axis substantially horizontal with respect to the ground. For example, the horizontal reaction vessel can be in the shape of either a tank or cylinder. Preferably, the horizontal reaction vessel is in the shape of a cylinder having a central axis that is substantially parallel with the ground. Such a horizontal reaction vessel is provided at one end with a supply port, through which a reaction solution containing a melted raw material is supplied, in the direction of the rotation axis of the agitator, and is provided at the other end with a discharge port, from which the reaction solution is extracted. Thus, a supplied reaction solution moves substantially horizontally in a direction from the supply port to the discharge port. The supply port is preferably located at a position lower than the rotation axis of the agitator, while the discharge port is also preferably located at a position lower than the rotation axis of the agitator.

An agitator disposed in the horizontal reaction vessel is not particularly limited to a certain type as long as agitation can be accomplished by the rotation of the agitator with its rotation axis, which is disposed to be substantially horizontal with respect to the ground, as a rotation center. Examples of agitators include a mixer having a single axis around which two or more mixing blades (that are circular, elliptical, triangular, quadrangular, or in a multifoil shape, for example) are placed at intervals therebetween, or having two or more axes that gear with one another. Using an agitator having two or more axes that gear with one another makes it possible to avoid adhesion of a reaction solution to the rotation axes of the agitator and to the reaction vessel; thus, it is preferable in terms of a self-cleaning action. When a mixer having two axes with multiple mixing blades is used, it is desirable that the mixing blades of the respective rotation axes be alternately arranged and that the two rotation axes be rotated in opposite directions to each other. The rotation axis does not necessarily mean the actual rotation axis member; it includes a rotation axis that merely functions as the center of rotation. Thus, the actual rotation axis member does not necessarily need to exist as long as the center of rotation of the agitator is positioned to be substantially horizontal with respect to the ground.

As a heating method of the horizontal reaction vessel, those commonly used in the art can be employed. Examples of such methods include a method in which a heating medium jacket is disposed around the reaction vessel so that a reaction solution is heated by heat transferred through the wall of the reaction vessel, and a method in which a heating medium is made to pass through the rotation axis of the agitator so that a reaction solution is heated by heat transferred. Such methods can be used either alone or in combination. The reaction vessel is preferably heated at a substantially constant temperature. A melted raw material supplied to the horizontal reaction vessel is initially heated by the aforementioned method so as to be polymerized. However, when the temperature of the reaction solution becomes higher than that of the heating medium due to a temperature rise with the heat of reaction, the heat would flow from the reaction solution to the heating medium. That is, the aforementioned heating method also functions as a cooling method. Therefore, being capable of effectively removing heat, the aforementioned method is advantageously used for the production of polymers in which heat is generated by polymerization reactions.

The inner space of the reaction vessel can be divided into multiple regions as appropriate and a heating method by which the temperature of a heating medium can be varied in each of the multiple regions can be used. To this end, using multiple heating medium jackets is considered. The inner space of the reaction vessel can be divided into regions based on the regions of spaces between weirs, for example. Accordingly, it is possible to create an environment in which, for example, the temperature of a heating medium is set high in a region in which a low-temperature reaction solution should be heated, and vice versa, the temperature of a heating medium is set low in a region in which heat should be removed from a reaction solution whose temperature has already increased due to the heat of reaction. In addition, when a heating medium that has been heated with a heating-medium heating device is supplied to the vicinity of the supply port, a temperature gradient can be provided in the reaction vessel. When the temperature of the heating medium becomes low, there is a possibility that the melted substance would become partially solidified and adhere to the inner wall of the reaction vessel. In that case, however, the substance that has adhered to the inner wall can be peeled off by the agitator provided in the reaction vessel.

The horizontal reaction vessel desirably includes weirs disposed therein. Such weirs are disposed so as to prevent a reaction solution from rapidly flowing from the supply port to the discharge port of the reaction vessel. The shape of each weir is not limited to a particular shape as long as it can block a flow of a reaction solution; it can be determined based on the shape of the reaction vessel. Preferably, the weir has the shape of a plate. A method of disposing the weirs is not particularly limited either. However, when each weir has the shape of a plate, it is disposed at an angle that is close to 90° with respect to the ground. In addition, the weirs are disposed on the inner wall of the bottom of the reaction vessel so that the lower side of the reaction vessel, for example, one third of the reaction vessel from the bottom in the cross section of the reaction vessel, in a direction perpendicular to the rotation axis of the agitator, is blocked. Herein, the angle that is close to 90° with respect to the ground means that the angle formed by the ground and each plate-form weir is 85° to 95°, or preferably 89° to 91°, or more preferably 90°. The weirs are preferably formed from materials with heat insulating properties.

In view of increasing the circulation of polymers, there are cases in which each weir is provided with through-holes. The through-holes are provided in positions closer to the bottom of the reaction vessel, preferably at a boundary between the weir and the inner wall of the bottom of the reaction vessel. The number of the through-holes is typically one to ten, or preferably one to five. With the provision of such through-holes, it is possible to circulate a reaction solution at an appropriate rate. The position for setting the weirs and the distance between each weir can be appropriately determined by one of ordinary skill in the art based on the reaction conditions and the like. For example, the positions for setting the weirs can be determined so that regions having a substantially equal polymer viscosity distribution are provided. After the positions for setting the weirs in the reaction vessel are determined, the diameter of each through-hole can be determined such that resistance that is generated when a reaction solution passes through the through-hole at a predetermined flow rate becomes lower than a drive force that is generated due to a difference in liquid levels of the reaction solution before and after the weir. A region between two weirs functions in a similar manner to a single mixed cell, and a reaction solution is homogenized by the mixture with an agitator. Accordingly, it is possible to suppress the influence that melted raw materials with low viscosity or polymers with a low polymerization degree and low viscosity would flow at a higher rate than polymers with a high polymerization degree and high viscosity, and thus are mixed. It should be noted that when a certain degree of viscosity of polymers is expected to be achieved and the possibility that the aforementioned mixture would occur is low, the weirs can be omitted.

By providing a difference in elevation between the supply port and the discharge port of the horizontal reaction vessel, it becomes possible to provide a drive force by which a reaction solution can move from the supply port to the discharge port. A reaction solution flows through the through-holes or a reaction solution whose liquid surface has a higher level than a weir flows into a region of a next stage due to the difference in levels, whereby the reaction solution can flow in a direction of the discharge port of the horizontal reaction vessel. The amount of a reaction solution supplied to the horizontal reaction vessel is not particularly limited. However, it is typically supplied so as to fill 10 to 70%, or preferably 40 to 50% of the volume of the horizontal reaction vessel, because such an amount is effective in suppressing a rapid flow of unreacted lactide. The horizontal reaction vessel is provided, as appropriate, with a device that measures the liquid level of a reaction solution, and a measured signal is fed back to a liquid transfer pump of the supply port of the reaction vessel or a liquid transfer pump of the discharge port of the reaction vessel, whereby the amount of a reaction solution to be transferred can be controlled such that the liquid level has a predetermined value.

Examples of methods of measuring the liquid level include a method in which a radioactive substance is disposed on the top of the horizontal reaction vessel and the amount of gamma rays generated from the radio active substance that is transmitted through a reaction solution is measured to determine the liquid level, a method in which ultrasonic waves or electromagnetic waves are emitted from above the horizontal reaction vessel so that reflected waves are measured to determine the liquid level, and a method in which a cylindrical capacitor is disposed on the top of the horizontal reaction vessel, and the capacitor is inserted in a reaction solution so that a change in dielectric constant resulting from a change in the liquid level of the reaction solution in the cylinder is measured to determine the liquid level.

Reaction conditions in the first-stage horizontal reaction vessel can be appropriately determined by one of ordinary skill in the art. The average reaction temperature in the reaction vessel is typically 140° C. to 180° C., or preferably 160° C. to 170° C. The residence time is typically 5 to 15 hours, or preferably 7 to 10 hours. The reaction conditions are preferably set such that polymers with a weight-average molecular weight of typically 50000 to 200000, or preferably 70000 to 150000 are obtained from the discharge port of the first-stage horizontal reaction vessel.

When a horizontal reaction vessel is used as a first-stage reaction vessel and the aforementioned weirs are provided in the reaction vessel, it is possible to suppress a phenomenon that melted raw materials with low viscosity or polymers with a low polymerization degree and low viscosity would be mixed with polymers that have undergone a certain degree of polymerization reaction. Thus, a piston flow in the reaction vessel can be achieved. In addition, it is possible to avoid such a circumstance that a reaction solution that has not yet reacted moves to a next step. Thus, a sufficient reaction can be carried out in the first-stage reaction vessel. Accordingly, a prolonged time of temperature history resulting from variations in residence time is avoided, and thus deterioration of polymers by thermal decomposition is suppressed and high-quality polymers can be obtained.

As a second-stage reaction vessel, a reaction device for performing polymerization reactions that includes at least at the final stage a reaction vessel having an agitator whose rotation axis is set to be substantially vertical with respect to the ground is used. Hereinafter, such a reaction vessel having an agitator whose rotation axis is set to be substantially vertical with respect to the ground will be referred to as a "vertical reaction vessel." A reaction device in this embodiment includes a vertical reaction vessel at least at the final stage. However, another/other vertical reaction vessel(s) can be provided at stages other than the final stage. The shape and the like of the reaction vessels other than the final-stage reaction vessel are not particularly limited, and those commonly used in the art can be employed. This embodiment describes a case in which a reaction device including a vertical reaction vessel at the final stage is used. However, a case of using a reaction device that includes a vessel, in which no substantial polymerization reaction is carried out and which is disposed at the next or subsequent stage of the reaction vessel, falls within the scope of the present invention.

To be substantially vertical with respect to the ground does not mean that the rotation axis of the agitator is strictly vertical. It rather means that the angle formed by the ground, namely, the horizon and the rotation axis is typically 85° to 95°, or preferably 89° to 91°, or more preferably 90°. As in the case of the horizontal reaction vessel, the rotational axis does not necessarily mean the actual rotation axis member; it includes a rotation axis that merely functions as the center of rotation. Thus, the actual rotation axis member does not necessarily need to exist as long as the center of rotation of the agitator is positioned to be substantially vertical with respect to the ground.

The shape of the vertical reaction vessel is not particularly limited as long as an agitator can be disposed in the vessel with its rotation axis substantially vertical with respect to the ground. For example, the vertical reaction vessel can be in the shape of either a vessel or a cylinder. Preferably, the vertical reaction vessel is in the shape of a cylinder having a central axis that is substantially parallel with the rotation axis of the agitator. Such a vertical reaction vessel is provided at one end with a supply port, through which a reaction solution from the preceding-stage reaction vessel is supplied, in the direction of the rotation axis of the agitator, and is provided at the other end with a discharge port, from which the reaction solution is extracted. Thus, a supplied reaction solution moves substantially perpendicularly in a direction from the supply port to the discharge port. The supply port is preferably located at the upper portion of the reaction vessel, while the discharge port is preferably located at the lower portion of the reaction vessel. Because the specific density of a polymer becomes higher as a polymerization reaction progresses, the provision of the supply port at the upper portion of the reaction vessel makes it possible to suppress mixture of polymers with a low polymerization degree with polymers with a high polymerization degree.

An agitator disposed in the vertical reaction vessel is not particularly limited to a certain type as long as agitating can be accomplished by the rotation of the agitator with its rotation axis, which is disposed to be substantially vertical with respect to the ground, as a rotation center. Examples of agitators include a mixer having a single axis around which two or more mixing blades (that are circular, elliptical, triangular, quadrangular, or in a multifoil shape, for example) are disposed at intervals therebetween, or having two or more axes that gear with one another. It is preferable to use a mixer having two axes with multiple mixing blades, in which the mixing blades of the respective rotation axes are alternately arranged. In that case, the two rotation axes are preferably rotated in opposite directions to each other. Using an agitator having two or more axes that gear with one another makes it possible to avoid adhesion of polymers and the like to the rotation axes of the agitator and to the reaction vessel; thus, in terms of a self-cleaning action, such an agitator can be particularly advantageously used for the reaction vessels at the latter stages in which polymers that have undergone polymerization reactions has higher viscosity.

As a heating method of the vertical reaction vessel, those commonly used in the art can be employed as in the case of the horizontal reaction vessel. Examples of such methods include a method in which a heating medium jacket is disposed around the reaction vessel so that a reaction solution is heated by heat transferred through the wall of the reaction vessel, and a method in which a heating medium is made to pass through the rotation axis of the agitator so that a reaction solution is heated by heat transferred. Such methods can be used either alone or in combination.

A melted raw material supplied to the vertical reaction vessel is initially heated by the aforementioned method so as to be polymerized. However, when the temperature of the reaction solution becomes higher than that of the heating medium due to a temperature rise with the heat of reaction, the heat would flow from the reaction solution to the heating medium. Thus, as in the case of the horizontal reaction vessel, the inner space of the vertical reaction vessel can be divided into multiple regions as appropriate and a heating method by which the temperature of a heating medium can be varied in each of the multiple regions can be used. Accordingly, it is possible to create an environment in which, for example, the temperature of a heating medium is set high in a region in which a low-temperature reaction solution should be heated, and vice versa, the temperature of a heating medium is set low in a region in which heat should be removed from a reaction solution whose temperature has already increased due to the heat of reaction. When further removal of heat is necessary, fins (projections and recessions to be provided on the sidewall of a reaction vessel) can be provided in the vertical reaction vessel, so that the heat removal efficiency is further improved. It is also possible to use a configuration in which a heating medium that has been heated with a heating-medium heating device is supplied to the vicinity of the discharge port so that polymers are kept warm and are prevented from becoming too cold.

Reactions at the latter stage of polymerization reactions are preferably carried out at high temperatures. However, there is a concern that polymers could deteriorate with an increase in temperature. Thus, using a vertical reaction vessel at the final stage makes it possible to suppress a temperature rise and reduce the influence that polymers would deteriorate and become colored.

Figure 2:
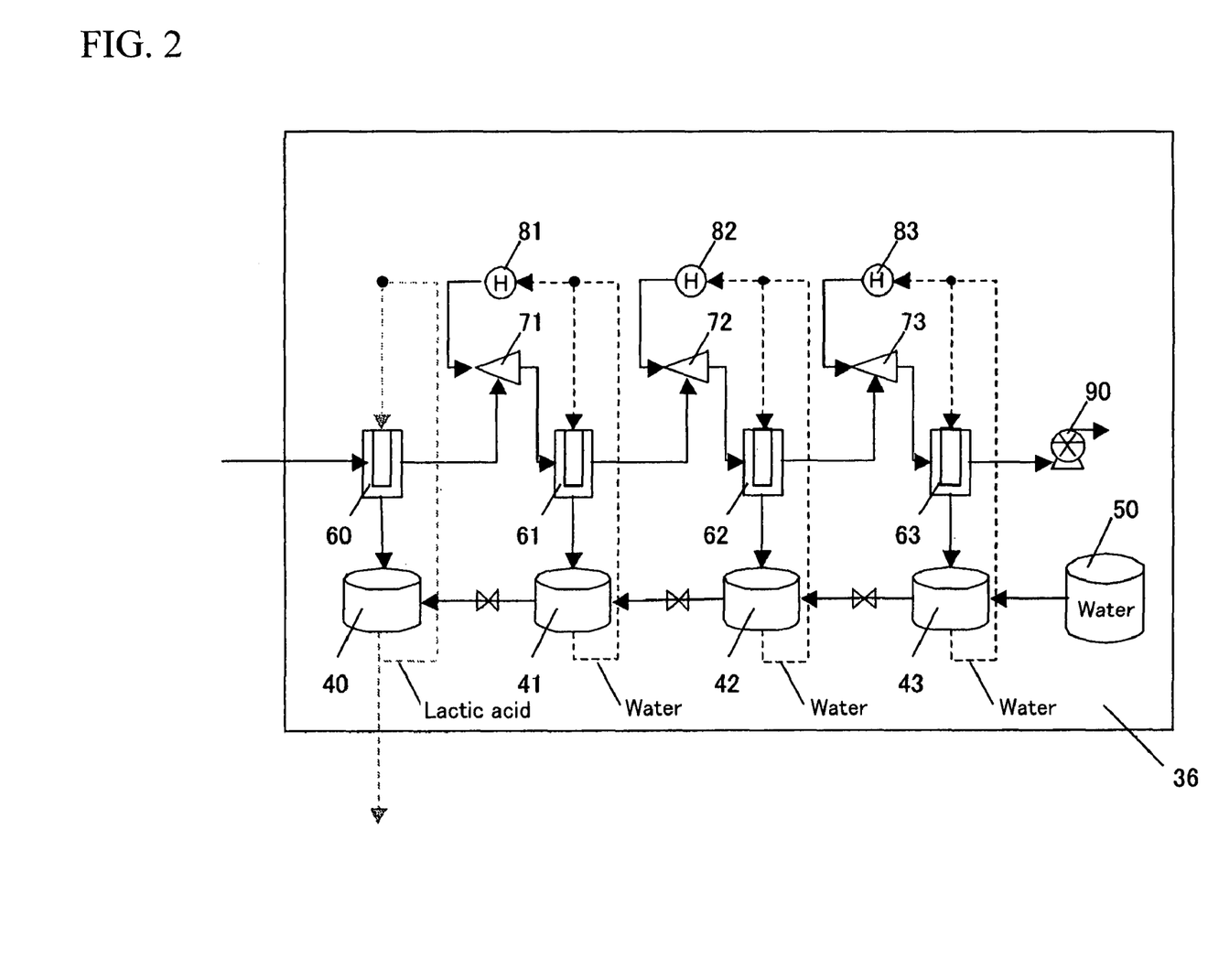
FIG. 2 is an enlarged view of an exhausting gas treatment device for use in a polylactide manufacturing apparatus and a method for manufacturing polylactide in accordance with the present invention.

The amount of a reaction solution supplied to the vertical reaction vessel is not particularly limited. However, it is typically supplied so as to fill 20 to 100%, or preferably 60 to 100% of the volume of the vertical reaction vessel. Thus, in comparison with a prior-art horizontal reaction vessel in which a reaction solution can be introduced to fill about a half of the volume of the reaction vessel, the vertical reaction vessel can have a large inner wall area for making contact with a reaction solution, and it can thus provide a larger area for heat transfer (FIG. 2). Removing heat that results from the polymerization reaction of raw materials by means of heat transfer makes it possible to reduce the temperature rise of a reaction solution and effectively suppress deterioration of the resulting polymerization product by thermal decomposition at the latter stage of polymerization reactions, and thereby to prevent the polymerization product from becoming colored. In particular, in the ring-opening polymerization of lactide, it is possible to effectively prevent the resulting polylactide from becoming colored. Further, when a vertical reaction vessel is formed such that its sidewall has projections and depressions, the area for heat transfer can be further increased and the heat removal efficiency can also be improved. When such a configuration in which the sidewall has projections and recessions is employed, it is possible to scrape off polymers with high viscosity that have adhered to the inner wall of the reaction vessel by disposing mixing blades such that they engage with the recess portions of the reaction vessel.

As the same manner with the horizontal reaction vessel, the vertical reaction vessel is also provided, as appropriate, with a device that measures the liquid level of a reaction solution, and a measured signal is fed back to a liquid transfer pump of the supply port of the reaction vessel or a liquid transfer pump of the discharge port of the reaction vessel, whereby the amount of a reaction solution to be transferred can be controlled such that the liquid level has a predetermined value. Examples of methods of measuring the liquid level include a method in which a radioactive substance is disposed on the top of the vertical reaction vessel and the amount of gamma rays generated from the radio active substance that is transmitted through a reaction solution is measured to determine the liquid level, a method in which ultrasonic waves or electromagnetic waves are emitted from above the vertical reaction vessel so that reflected waves are measured to determine the liquid level, and a method in which a cylindrical capacitor is disposed on the top of the vertical reaction vessel, and the capacitor is inserted in a reaction solution so that a change in dielectric constant resulting from a change in the liquid level of the reaction solution in the cylinder is measured to determine the liquid level.

Reaction conditions in the final-stage vertical reaction vessel can be appropriately determined by one of ordinary skill in the art. The average reaction temperature in the reaction vessel is typically 180° C. to 220° C., or preferably 190° C. to 210° C. The residence time is typically 1 to 7 hours, or preferably 3 to 5 hours. The reaction conditions are preferably set such that polymers with a weight-average molecular weight of typically 100000 to 500000, or preferably 150000 to 300000 are obtained from the discharge port of the final-stage vertical reaction vessel.

The volatilizer of the present invention is disposed at the next stage of the polymerization reaction device, so that unreacted raw materials are removed from the reaction solution discharged from the reaction device. In the volatilizer, a negative pressure environment is created while maintaining the unreacted raw materials in the melted state, so that the unreacted raw materials or solvent such as lactide are removed.

As a volatilizer, it is desirable to use an agitator whose rotational movement's center is set to be substantially horizontal with respect to the ground. Hereinafter, such an agitator having an agitating device whose rotational movement's center is set to be substantially horizontal with respect to the ground will be referred to as a "horizontal agitator." To be substantially horizontal with respect to the ground does not mean that the rotation center of the agitator is strictly horizontal. It rather means that the angle formed by the ground, namely, the horizon and the rotation center is typically $-5°$ to $5°$, or preferably $-1°$ to $1°$, or more preferably $0°$.

The shape of the horizontal agitator is not particularly limited as long as the agitator can be disposed such that its rotational movement's center is substantially horizontal with respect to the ground. For example, the agitator can be in the shape of either a tank or a cylinder. Preferably, the agitator is in the shape of a cylinder whose rotation center is substantially horizontal with respect to the ground. Such a horizontal stirrer is provided at one end with a supply port, through which a reaction solution containing a melted raw material is supplied, in the direction of the rotation axis of the agitator, and is provided at the other end with a discharge port, from which the reaction solution is extracted. Thus, a supplied reaction solution moves substantially horizontally in a direction from the supply port to the discharge port. The supply port is provided at a position lower than the liquid level of a reaction solution in the agitator. Accordingly, turbulence that could occur in the flow of the reaction solution within the agitator can be avoided, and an extrusion flow is achieved. Meanwhile, the discharge port is also preferably provided at a position lower than the rotation center of the agitator.

An agitator disposed in the horizontal tank is not particularly limited to a certain type as long as agitation can be accomplished by the rotation of the agitator with its rotation center, which is disposed to be substantially horizontal with respect to the ground, as a center. Examples of agitators include a mixer having a single axis around which two or more mixing blades (that are circular, elliptical, triangular, quadrangular, or in a multifoil shape, for example) are disposed at intervals therebetween, or having two or more axes that gear with one another. In the present invention, mixing blades that have no actual rotation axis member at their center of rotation are used so as to avoid adhesion of a reaction solution to the rotation axis. Accordingly, adhesion of a reaction solution to the rotation axis is avoided and thermal decomposition is suppressed, whereby high-quality polymers with almost no color and with a high molecular weight can be manufactured. As the mixing blades, mixing blades of a lattice-blade polymerizer (a product of Hitachi, Ltd.) or those disclosed in Reference 2 (JP Published Patent Application No. 2004-10791 A) can be used.

In order to create a negative pressure environment in the volatilizer, at least two stages each including an ejector, a condenser provided downstream of the ejector, and a hot well connected to the condenser are provided. The condenser at the first stage is operated with liquid containing lactic acid as a main component, while ejectors at the stages following the first stage are driven with vapor containing water vapor as a main component.

Polymers obtained with the use of the volatilization method of the present invention are usually subjected to water cooling and then to a pelletizing process with a tip cutter, though such process can be omitted.

Each of the raw material melting device, the catalyst supply device, the reaction device including various reaction vessels, the volatilizer, and the like used in the polymer synthesizing apparatus of the present invention is preferably provided with a nitrogen gas supply pipe and discharge pipe to purge the inside of the device with a nitrogen gas. In addition, it is preferable that a synthetic process be basically started after all of the devices involved in the process are purged with nitrogen. Accordingly, it becomes possible to avoid burning of a reaction solution that could otherwise occur due to the presence of oxygen. Further, it is preferable that each of the raw material melting device, the catalyst supply device, the raw material supply device, the reaction vessels, and the like be operated at a pressure that is about equal to the atmospheric pressure so that volatilization of melted raw materials is reduced.

Although the present invention will be hereinafter described in more detail by way of examples, the scope of the present invention is not limited thereto.

EXAMPLES

Figure 1:
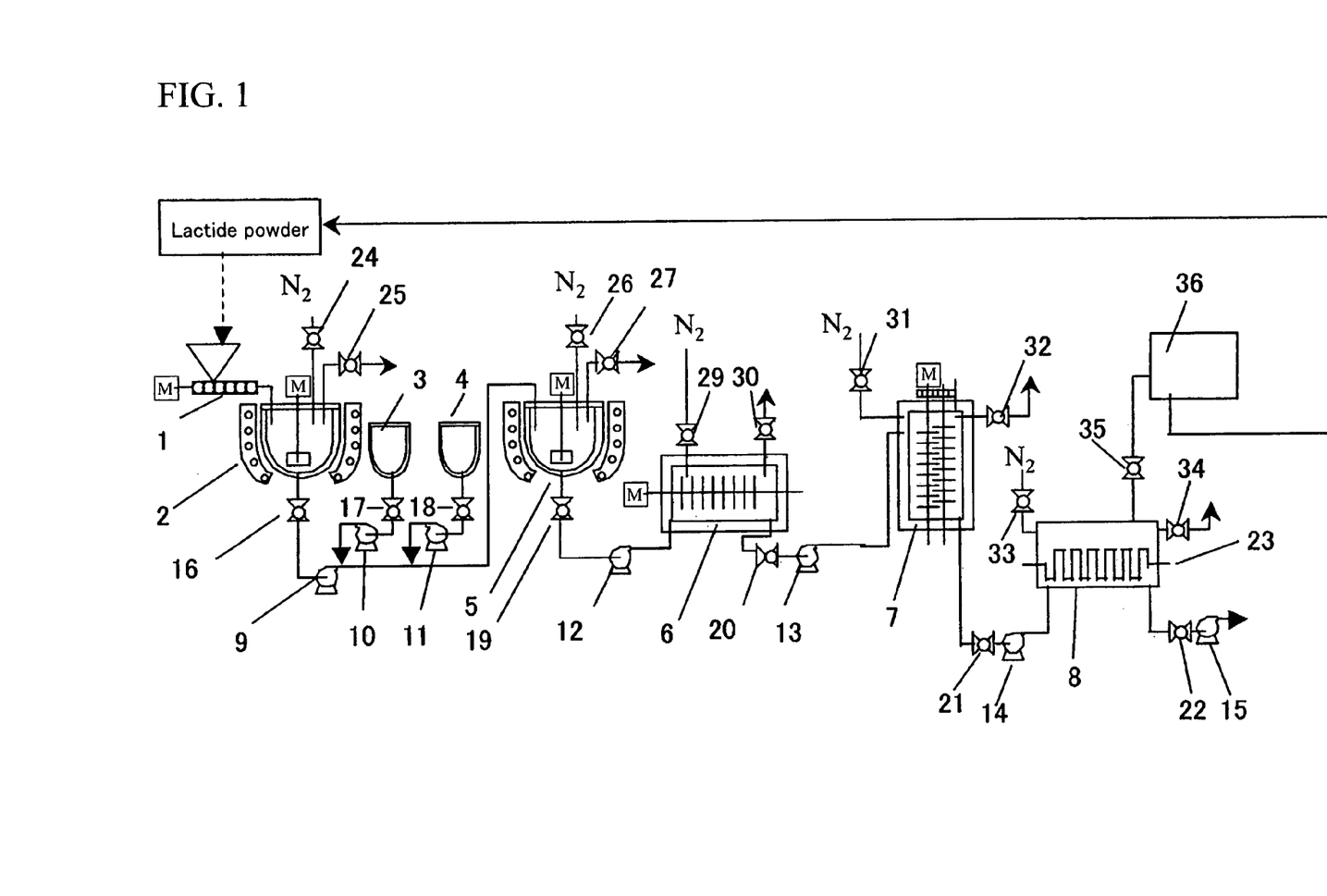
FIG. 1 illustrates the overall structure of an example of a polylactide manufacturing apparatus and a method for manufacturing polylactide in accordance with the present invention.

FIG. 1 illustrates the overall structure of an example of a polylactide manufacturing apparatus and a method for manufacturing polylactide in accordance with the present invention. In this example, polymerization for producing polylactide is carried out with an apparatus including a lactide supply device 1, a lactide melting device 2, a catalyst supply device 3, a polymerization initiator supply device 4, a lactide supply device 5, a horizontal reaction vessel 6, a vertical reaction vessel 7, a volatilizer 8, liquid transfer pumps 9-15, and valves 16-22. This example illustrates a case in which a reaction device includes two tanks that are the horizontal reaction vessel 6 and the vertical reaction vessel 7 connected in series, and unreacted lactide is removed using the volatilizer 8. Part of the liquid transfer pumps 9-15 can be omitted if a liquid to be transported has low viscosity and can thus be transported with the use of the gravity of the liquid. Part of the valves 16-22 can also be omitted depending on circumstances.

The lactide supply device 1 supplies lactide in powder form to the lactide melting device 2. Exemplary methods of transporting lactide with the lactide supply device 1 include a transport method with a screw feeder, a transport method with ultrasonic vibration, and a transport method with a gas flow. In the lactide melting device 2, lactide that has been transported is heated so as to be melted. The heating temperature is set to be greater than or equal to the melting point of lactide, and is desirably set to be less than or equal to 160° C. so that deterioration by heat would not occur. When lactide as a raw material is supplied not in solid or power form but in liquid form, the lactide supply device 1 functions as a liquid transfer pump and the lactide melting device 2 functions as a buffer tank. After the valve 16 is opened, melted lactide produced in the lactide melting device 2 is discharged by the liquid transfer pump 9. Then, the valves 17 and 18 are opened and a catalyst and a polymerization initiator are supplied to the melted lactide from the catalyst supply device 3 and the polymerization initiator supply device 4, respectively, using the pumps 10 and 11. Then, the mixture is supplied to the lactide supply device 5. It should be noted that the flow rate of the melted lactide discharged by the liquid transfer pump 9, the proportion of the amount of a catalyst supplied from the catalyst supply device 3 to the flow rate of the melted lactide, and the proportion of the amount of a polymerization initiator supplied from the polymerization initiator supply device 4 to the flow rate of the melted lactide do not need to be constantly the same, and can be changed as appropriate according to circumstances.

In the lactide supply device 5, the melted lactide is maintained at a temperature that is greater than or equal to the melting point of lactide, and desirably less than or equal to 160° C. The lactide supply device 5 is essentially a buffer tank, and can be omitted depending on circumstances. After the valve 19 is opened, the melted lactide in the lactide supply device 5 is continuously supplied to the horizontal reaction vessel 6 by the liquid transfer pump 12. It should be noted that when the lactide supply device 5 is omitted, the liquid transfer pump 12 is also omitted.

In order to avoid coagulation and plugging of lactide that could occur with a decrease in temperature, liquid transfer pipes located at positions preceding and following the liquid transfer pumps 9, 12, and 13 are maintained at a temperature that is greater than or equal to the melting point of lactide and desirably less than or equal to 160° C. by heating, heat retaining, or the like. Thermocouples are inserted in the lactide melting device 2, the lactide supply device 5, and the pipes located at positions preceding and following the liquid transfer pumps 9, 12, and 13, so that the temperature of the melted raw material at each position is measured.

The melted lactide flows through the horizontal reaction vessel 6 due to a difference in elevation between a supply port and a discharge port, whereby a polymerization reaction proceeds. The reaction solution in the horizontal reaction vessel is heated by a heating medium jacket provided around the reaction vessel.

The reaction solution is transported to a supply port provided at the upper portion of the vertical reaction vessel 7, and then it flows in a direction toward a discharge port provided at the lower portion of the vertical reaction vessel by gravity, whereby a polymerization reaction proceeds. Accordingly, it is possible to avoid mixture of polymers with a low polymerization degree with polymers with a high polymerization degree. The reaction solution in the vertical reaction vessel is heated by a heating medium jacket provided around the reaction vessel, whereas heat will be removed if the temperature of the heating medium is lower than that of polymers.

In comparison with the horizontal reaction vessel 6, the vertical reaction vessel 7 can have a larger area for heat transfer. Thus, it provides for a high heating efficiency and high heat removal efficiency. Thus, when such a vertical reaction vessel is provided at the final stage, it is possible to reduce the influence of deterioration of polymers that could occur with an increase in temperature due to the heat of reaction. In the vertical reaction vessel 7, an agitator that has two rotation axes each provided with mixing blades and that is suitable for agitating polymers with high viscosity is used. The reaction solution in the vertical reaction vessel 7 is continuously discharged by gravity and by the liquid transfer pump 14 with the valve 21 in an open position, so that the reaction solution is transported to the volatilizer 8. The liquid transfer pump 14 can be selected from among an extraction screw, gear pump, and the like in accordance with the viscosity of reaction solutions. Transfer pipes located at positions preceding and following the liquid transfer pump 14 should be heated and kept warm in order to avoid plugging that could otherwise occur due to the coagulation of a reaction solution within the pipes. The temperature in that case is desirably less than or equal to 200° C. so that polymers would not be thermally decomposed.

In the volatilizer 8, a negative pressure environment is created while maintaining the unreacted raw material in the melted state, so that unreacted lactide is removed. A supply port of the volatilizer 8 is provided at a position lower than the liquid level of the reaction solution. Accordingly, turbulence that could occur in the flow of the reaction solution within the agitator can be avoided, an extrusion flow is achieved, and a reverse flow is avoided, whereby an increase in residence time is suppressed. Thus, thermal decomposition is suppressed and high-quality polymers with almost no color and with a high molecular weight can be manufactured.

The reaction solution that has been treated in the volatilizer 8 is continuously discharged by the liquid transfer pump 15 with the valve 22 in an open position. The liquid transfer pump can be selected from among an extraction screw, gear pump, and the like in accordance with the viscosity of reaction solutions. The discharged polymers are usually subjected to water cooling and then to a pelletizing process with a tip cutter.

Meanwhile, unreacted lactide that has been removed by the volatilizer 8 is transferred to the exhausting gas treatment device 36 with the valve 35 in an open position. The lactide collected by the exhausting gas treatment device 36 is reused as the raw material lactide.

FIG. 2 is an enlarged view of an exhausting gas treatment device for use in a polylactide manufacturing device and a method for manufacturing polylactide in accordance with the present invention. The details of the exhausting gas treatment device 36 will be described with reference to FIG. 2. A liquid containing lactic acid as a main component is circulated through a main condenser 60 and a main hot well 40 at the first stage, and unreacted lactide that has been removed by the volatilizer 8 is collected by being cooled. At this time, suction of unreacted lactide from the valve 35 to the main condenser 60 is accomplished by the suction force of an ejector 71.

When the concentration of lactic acid in the main hot well 40 is increased with the collection of lactide, there is a concern that the main condenser 60 could become occluded by the polymerization of lactide. Thus, a lactic acid solution of a lower concentration is sent from a hot well 41 to the main hot well 40 so that the concentration of lactic acid in the main hot well 40 is suppressed.

A liquid containing water as a main component is circulated through a condenser 61 and a hot well 41 at the second stage. This liquid is heated with a boiler 81 to form vapor, which in turn drives the ejector 71. At this time, suction of unreacted lactide from the ejector 71 to the condenser 61 is accomplished by the suction force of an ejector 72. When the concentration of lactic acid in the hot well 41 is increased with the collection of lactide by the ejector 71, there is a concern that the condenser 61 could become occluded by the polymerization of lactide. Thus, a lactic acid solution of a lower concentration is sent from a hot well 42 to the hot well 41 so that the concentration of lactic acid in the hot well 41 is suppressed.

A liquid containing water as a main component is circulated through a condenser 62 and a hot well 42 at the third stage. This liquid is heated with a boiler 82 to form vapor, which in turn drives the ejector 72. At this time, suction of unreacted lactide from the ejector 72 to the condenser 62 is accomplished by the suction force of an ejector 73. When the concentration of lactic acid in the hot well 42 is increased with the collection of lactide by the ejector 72, there is a concern that the condenser 62 could become occluded by the polymerization of lactide. Thus, a lactic acid solution of a lower concentration is sent from a hot well 43 to the hot well 42 so that the concentration of lactic acid in the hot well 42 is suppressed.

A liquid containing water as a main component is circulated through a condenser 63 and a hot well 43 at the fourth stage. This liquid is heated with a boiler 83 to form vapor, which in turn drives the ejector 73. At this time, suction of unreacted lactide from the ejector 73 to the condenser 63 is accomplished by the suction force of a vacuum pump 90. When the concentration of lactic acid in the hot well 43 is increased with the collection of lactide by the ejector 73, there is a concern that the condenser 63 could become occluded by the polymerization of lactide. Thus, water is sent from a water tank 50 to the hot well 43 so that the concentration of lactic acid in the hot well 43 is suppressed.

Since a liquid containing water as a main component is circulated through the condensers at the stages following the first stage, when the concentrations of lactic acid in the condensers 60 to 63 are compared with one another, the concentration of lactic acid tends to be lower in the hot well 43 than in the main hot well 40 because the lactide is diluted with water. In addition, since the vapor pressure of water is higher than that of lactic acid, when the pressures in the condensers 60 to 63 are compared with one another, the pressure is higher in the condenser 63 than in the condenser 60. For example, in the four-stage exhausting gas treatment device 36 such as the one shown in FIG. 2, the pressures of the first stage, second stage, third stage, and fourth stage are 0.8 Torr, 8 Torr, 30 Torr, and 80 Torr, respectively. This reveals the fact that the use of a multi-stage exhausting gas treatment device allows the volatilizer 8 to be maintained at a high vacuum even if the performance of the vacuum pump 90 is relatively low. That is, a sufficient degree of vacuum can be ensured even in a large plant in which a high vacuum is supposed to be difficult to achieve.

In addition, since a liquid containing water as a main component is circulated through the condensers at the stages following the first stage, the concentration of lactic acid in such condensers can be suppressed to be lower than in the condenser at the first stage. Accordingly, the ejectors 71 to 73, the condensers 61 to 63, and the hot wells 41 to 43 at the stages following the first stage are less susceptible to the influence of corrosion by lactic acid, and thus there is no need to use corrosion-resistant materials such as titanium. Accordingly, the cost of the apparatus can be suppressed low.

Each of the lactide supply device 1, the lactide melting device 2, the catalyst supply device 3, the polymerization initiator supply device 4, the lactide supply device 5, the horizontal reaction vessel 6, the vertical reaction device 7, and the volatilizer 8 is provided with a nitrogen gas supply pipe and discharge pipe to purge the inside of the device with a nitrogen gas. This is in order to avoid burning of a reaction solution that could otherwise occur due to the presence of oxygen. It is desirable that a synthetic process be basically started after all of the devices involved in the process are purged with nitrogen. In addition, each of the lactide supply device 1, the lactide melting device 2, the catalyst supply device 3, the polymerization initiator supply device 4, the lactide supply device 5, the horizontal reaction vessel 6, and the vertical reaction device 7 is driven at a pressure that is about equal to the atmospheric pressure in order to reduce the volatilization of melted lactide.

What is claimed is:

1. An apparatus for manufacturing polylactide which includes the steps of preparing lactide through oligomerization of lactic acid and depolymerization of the resulting oligomers, effecting ring-opening polymerization of the lactide, and removing unreacted lactide from the resulting polymers, the apparatus comprising an exhausting gas treatment device for reducing pressure in the step of removing unreacted lactide, wherein the exhausting gas treatment device includes:
a boiler for generating water vapor;
a pressure-reducing section having a stage including an ejector driven with the water vapor, a condenser connected downstream of the ejector, and a hot well tank connected to the condenser; and
a main condenser and a main hot well tank connected to the main condenser, the main condenser and the main hot well tank being disposed on a pipe line through which a gas of the unreacted lactide is suctioned into the pressure-reducing section, and
wherein the gas of the unreacted lactide is washed away in the main condenser with the use of a liquid collected in the main hot well tank.

2. An apparatus for manufacturing polylactide which includes the steps of preparing lactide through oligomerization of lactic acid and depolymerization of the resulting oligomers, effecting ring-opening polymerization of the lactide, and removing unreacted lactide from the resulting polymers, the apparatus comprising an exhausting gas treatment device for reducing pressure in the step of removing unreacted lactide, wherein the exhausting gas treatment device includes:
a boiler for generating water vapor;
a pressure-reducing section having a stage including an ejector driven with the water vapor, a condenser connected downstream of the ejector, and a hot well tank connected to the condenser; and
a main condenser and a main hot well tank connected to the main condenser, the main condenser and the main hot well tank being disposed on a pipe line through which a gas of the unreacted lactide is suctioned into the pressure-reducing section, and wherein the gas of the unreacted lactide is washed away in the main condenser with the use of a liquid containing lactic acid as a main component, the liquid having been collected in the main hot well tank.

3. The apparatus for manufacturing polylactide according to claim 1, wherein the exhausting gas treatment device further includes a vacuum pump for reducing a pressure in the pressure-reducing section.

4. The apparatus for manufacturing polylactide according to claim 1, wherein the exhausting gas treatment device further includes a water tank and pipe lines through which water in the water tank is supplied to the main hot well tank via the hot well tank.

5. The apparatus for manufacturing polylactide according to claim 4,
wherein each of the main hot well tank and the hot well tank includes a device that directly or indirectly measures a concentration of lactic acid, and
wherein, when a measured concentration of lactic acid has exceeded a predetermined value, a lactic acid solution of a lower concentration is caused to flow from the hot well tank to the main hot well tank or water is caused to flow from the water tank to the hot well tank, so that the concentration of lactic acid is controlled.

6. The apparatus for manufacturing polylactide according to claim 2, wherein the exhausting gas treatment device further includes a vacuum pump for reducing a pressure in the pressure-reducing section.

7. The apparatus for manufacturing polylactide according to claim 2, wherein the exhausting gas treatment device further includes a water tank and pipe lines through which water in the water tank is supplied to the main hot well tank via the hot well tank.

8. An apparatus for manufacturing polylactide which includes the steps of preparing lactide through oligomerization of lactic acid and depolymerization of the resulting oligomers, effecting ring-opening polymerization of the lactide, and removing unreacted lactide from the resulting polymers, the apparatus comprising an exhausting gas treatment device for reducing pressure in the step of removing unreacted lactide,
wherein the exhausting gas treatment device includes:
a boiler for generating water vapor;
a pressure-reducing section having multiple stages connected in series, the multiple stages each including an ejector driven with the water vapor, a condenser connected downstream of the ejector, and a hot well tank connected to the condenser; and
a main condenser and a main hot well tank connected to the main condenser, the main condenser and the main hot well tank being disposed on a pipe line through which a gas of the unreacted lactide is suctioned into the pressure-reducing section, and
wherein the gas of the unreacted lactide is washed away in the main condenser with the use of a liquid containing lactic acid as a main component, the liquid having been collected in the main hot well tank.

9. The apparatus for manufacturing polylactide according to claim 8, wherein the exhausting gas treatment device further includes a water tank and pipe lines through which water in the water tank is sequentially supplied, via the multiple hot well tanks, to the main hot well tank.

10. A apparatus for manufacturing polylactide which includes the steps of preparing lactide through oligomerization of lactic acid and depolymerization of the resulting oligomers, effecting ring-opening polymerization of the lactide, and removing unreacted lactide from the resulting polymers, the apparatus comprising an exhausting gas treatment device for reducing pressure in the step of removing unreacted lactide,
wherein the exhausting gas treatment device includes:
a boiler for generating water vapor;
a pressure-reducing section having multiple stages connected in series, the multiple stages each including an ejector driven with the water vapor, a condenser connected downstream of the ejector, and a hot well tank connected to the condenser; and
a main condenser and a main hot well tank connected to the main condenser, the main condenser and the main hot well tank being disposed on a pipe line through which a gas of the unreacted lactide is suctioned into the pressure-reducing section, and
wherein the gas of the unreacted lactide is washed away in the main condenser with the use of a liquid collected in the main hot well tank.

11. The apparatus for manufacturing polylactide according to claim 8, wherein the exhausting gas treatment device further includes a vacuum pump for reducing a pressure in the pressure-reducing section.

12. The apparatus for manufacturing polylactide according to claim 10, wherein the exhausting gas treatment device further includes a vacuum pump for reducing a pressure in the pressure-reducing section.

13. The apparatus for manufacturing polylactide according to claim 10, wherein the exhausting gas treatment device further includes a water tank and pipe lines through which water in the water tank is sequentially supplied, via the multiple hot well tanks, to the main hot well tank.

14. The apparatus for manufacturing polylactide according to claim 13,
wherein each of the main hot well tank and the multiple hot well tanks includes a device that directly or indirectly measures a concentration of lactic acid, and
wherein, when a concentration of lactic acid measured in one of the hot well tanks has exceeded a predetermined value, water or a lactic acid solution of a lower concentration is caused to flow to the relevant hot well tank from the water tank or a hot well tank that is located immediately after the relevant hot well tank, so that the concentration of lactic acid is controlled.

15. A method for manufacturing polylactide, comprising the steps of preparing lactide through oligomerization of lactic acid and depolymerization of the resulting oligomers, effecting ring-opening polymerization of the lactide, and removing unreacted lactide from the resulting polymers, the method including an exhausting gas treatment method for reducing pressure in the step of removing unreacted lactide,
wherein the exhausting gas treatment method includes the steps of:
generating water vapor;
driving an ejector with the generated water vapor so as to suction a gas of the unreacted lactide;
washing away the gas of the unreacted lactide in a main condenser with the use of a liquid containing lactic acid as a main component that has been collected in a main hot well tank, using the suction of the ejector; and
mixing the gas of the unreacted lactide suctioned by the ejector with the water vapor, guiding the mixture into a condenser connected downstream of the ejector, and guiding the lactic acid collected in the condenser into a hot well tank.

16. The method for manufacturing polylactide according to claim 15, wherein the gas of the unreacted lactide that has passed through the ejector is suctioned by means of a vacuum pump.

17. The method for manufacturing polylactide according to claim 15, wherein the step of mixing the gas of the unreacted lactide suctioned by the ejector with the water vapor, guiding the mixture into the condenser connected downstream of the ejector, and guiding the lactic acid collected in the condenser into the hot well tank is performed a plurality of times in series.

* * * * *